United States Patent [19]

Price et al.

[11] 3,813,954

[45] June 4, 1974

[54] FRICTION DRIVE WITH AXIALLY SPACED DISKS AND INTERMEDIATE SHIFTABLE WHEEL

[75] Inventors: Warren H. Price, Sheboygan; Lynn E. Hochwitz, Plymouth, both of Wis.

[73] Assignee: Gilson Bros. Co., Plymouth, Wis.

[22] Filed: Sept. 7, 1972

[21] Appl. No.: 287,134

Related U.S. Application Data

[63] Continuation of Ser. No. 101,471, Dec. 28, 1970, abandoned.

[52] U.S. Cl. ........................................ 74/194, 74/202
[51] Int. Cl. ........................ F16h 17/00, F16h 15/08
[58] Field of Search ...................... 74/194, 202, 197

[56] References Cited
UNITED STATES PATENTS
1,198,915  9/1916  Haynes ................................ 74/194
1,960,103  5/1934  Fierce ................................. 74/202
2,622,689  12/1952  Szager ................................. 74/202
2,796,770  6/1957  Mann .................................. 74/202
2,989,134  6/1961  Kamlukin et al. ..................... 74/202
3,580,351  5/1971  Mollen ................................ 74/194

FOREIGN PATENTS OR APPLICATIONS
163,188  6/1915  Canada

Primary Examiner—Benjamin W. Wyche
Assistant Examiner—Allan Russell Burke
Attorney, Agent, or Firm—Wheeler, Morsell, House & Fuller

[57] ABSTRACT

Drive train comprising a shaft having axially spaced friction disks and an intermediate shiftable friction wheel selectively engageable with one or the other of said disks, thus to afford relative rotation of the disks and the wheel selectively in opposite directions, depending on which disk is contacted by the wheel.

3 Claims, 4 Drawing Figures

PATENTED JUN 4 1974

3,813,954

Inventors
Warren H. Price
Lynn E. Hochwitz
By
Wheeler, House & Wheeler
Attorneys

FRICTION DRIVE WITH AXIALLY SPACED DISKS AND INTERMEDIATE SHIFTABLE WHEEL

This is a continuation of application Ser. No. 101,471 filed Dec. 28, 1970, now abandoned.

BACKGROUND OF THE INVENTION

In friction drive trains of the type shown in assignee's copending application Ser. No. 74,282 filed Sept. 22, 1970, now U.S. Pat. No. 3,678,770 granted July 25, 1972, reverse rotating of a friction wheel is accomplished by shifting the wheel to the opposite side of the axis of rotation of a drive disk. Accordingly, one face of the disk must be unobstructed to permit tranverse of the wheel across the disk face and past its axis of rotation.

SUMMARY OF THE INVENTION

In accordance with the present invention, it is unnecessary to shift the friction wheel across the axis of rotation of the drive disk. The drive shaft carrying the drive disk is extended and is supplied with another drive disk in axially spaced relation to the first drive disk. The friction wheel is mounted intermediate the two drive disks and is supported on a swing mount by which the friction wheel can be selectively shifted into contact with one or the other of said drive disks. This affords reversal of wheel rotation without the necessity for shifting the wheel laterally past the axis of rotation of the drive disk. This arrangement simplifies the mounting of the drive disk because it can be supported by shafts on both sides of its center of rotation, as distinguished from the prior art in which the drive disk must have a cantilever support to clear one side of the disk for shifting motions of the friction wheel.

The spacing of the axially spaced friction disks is somewhat greater than the diameter of the friction wheel so that shifting motions of the friction wheel will selectively position it for rotation in opposite directions as it bears against one or the other of the disks, and in a neutral non-driven position in which it engages neither disk.

Where desired, lateral shifting of the friction wheel can be provided for, thus to afford speed variations by adjusting the speed ratio between the disks and the wheel.

Other objects, features and advantages of the invention will appear from the following disclosure.

DESCRIPTION OF PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 4:
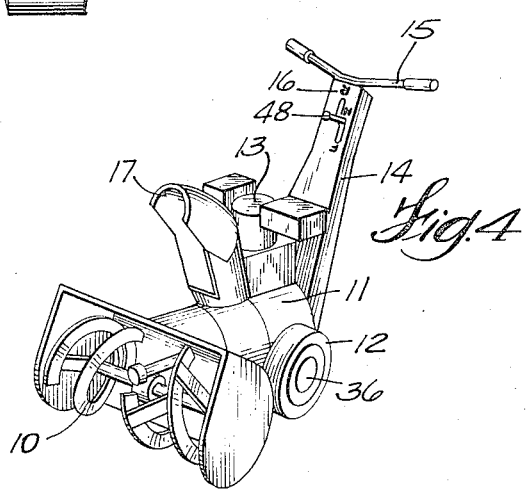
FIG. 4 is a reduced scale perspective view of a snow thrower, this being a typical piece of outdoor power equipment to which the invention is applicable.

The drive train of the present invention is widely applicable to any driven equipment in which forward and reverse drive options are required. A typical example is the snow thrower vehicle shown in FIG. 4. The snow thrower has a snow collecting and feeding auger 10 which is mounted on a frame 11 supported by paired wheels 12 by which the vehicle is propelled over the ground under power of engine 13. A control column 14 is provided with steering handles 15 and a control panel 16. A discharge chute 17 directs the flow of snow impelled by the auger and a second stage impeller (not shown).

Figure 1:
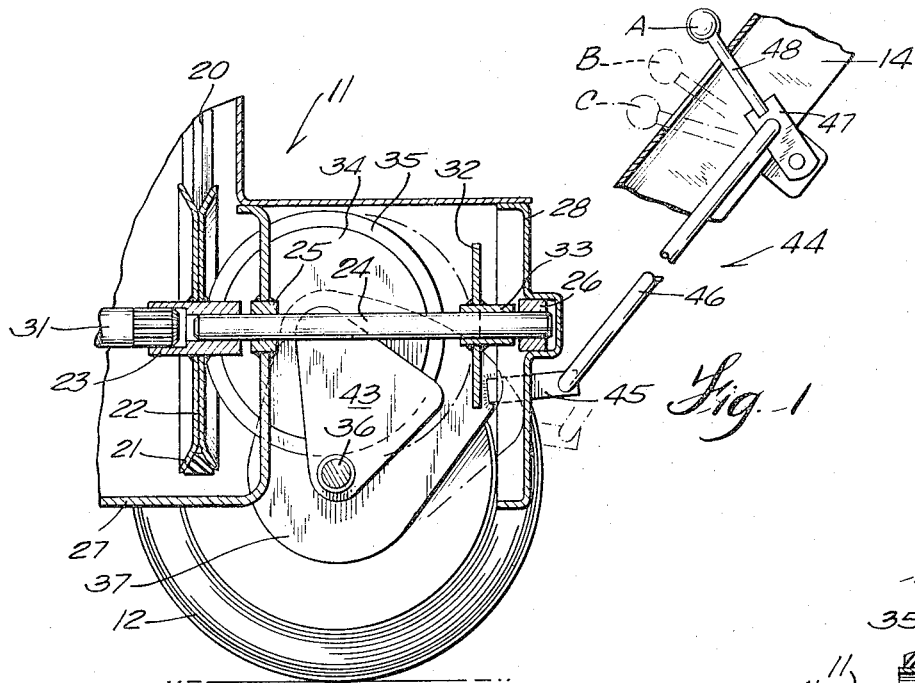
FIG. 1 is a vertical cross section through a drive train embodying the invention. This view is taken along the line 1—1 of FIG. 2.
Figure 2:
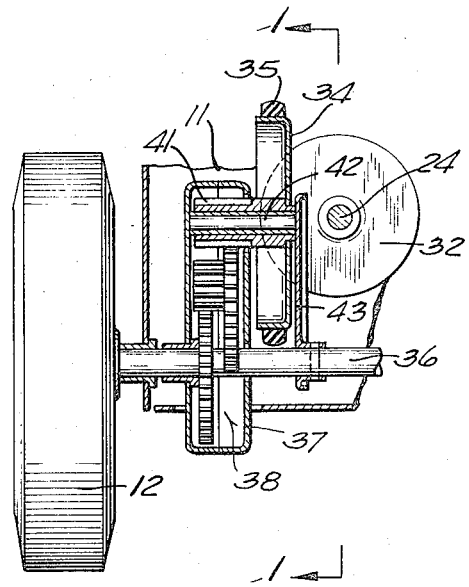
FIG. 2 is a transverse cross section taken through the apparatus shown in FIG. 1.
Figure 3:
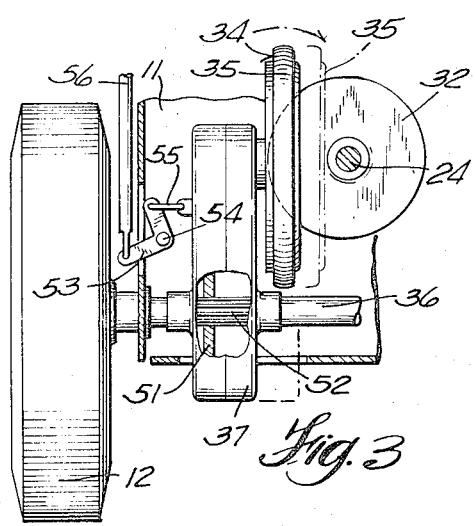
FIG. 3 is a view partly in elevation and partly in section of apparatus similar to that shown in FIG. 2, but illustrating a modified embodiment in which the friction wheel is adjustable laterally with respect to the axis of rotation of the friction disks, thus to achieve speed variations.

The engine 13 drives the wheels 12 through the drive train mechanism shown in detail in FIGS. 1, 2 and 3. Power is transmitted from the engine 13 through a belt 20 engaged with sheave 21 of a friction disk 22. Friction disk 22 has a hollow hub 23 fast to a shaft 24 which is supported in housing 11 on bearings 25 and 26 which are respectively mounted in housing walls 27, 28. The auger 10 of the snow thrower may be powered independently or from disk 22; for example, by shaft 31 which has a drive coupling to the disk hub 23.

Axially spaced from friction disk 22 is another friction disk 32 which is keyed to shaft 24 by sleeve hub 33. Accordingly, both friction disks 22, 32 rotate together and in the same direction.

Intermediate the two friction disks 22, 32 is a friction wheel 34 having a rubber tire 35. Wheel 34 is mounted on an axis transverse to drive shaft 24 for swinging movement between its full and broken line positions shown in FIG. 1, thus to selectively engage either one of friction disks 22, 32. The wheel 34 is supported on power output shaft 36 which in the disclosed embodiment also constitutes the axle for the snow thrower ground engaging wheels 12. Shaft 36 pivotally supports gear set housing 37 which contains an interengaging set of gears indicated collectively by reference character 38 in FIG. 2. One such pinion gear 41 is mounted inside of the housing 37 on the jack shaft 42 for wheel 34. The other end of the jack shaft 42 is desirably supported on swing bracket 43 which is also pivotally mounted on the power output shaft 36.

The pivotal position of the wheel 35 is adjusted by shift means 44 which includes a tab 45 welded to the gear set housing 37, a rod link 46 and control handle or lever 48. The rod link 46 extends from the tab 45 along the control column 14 to a pivotal connection with the base 47 of the control lever 48. The operator can swing the control lever 48 through its various positions on the control panel 16 as illustrated in full and broken lines in FIG. 1. These positions include a reverse position shown in full lines at A in which the friction wheel 34 is advanced to engage friction disk 22 to drive the vehicle in a reverse direction. At position B shown in broken lines, the wheel 34 is in a neutral position in which it is intermediate both friction disks 22, 32 and is undriven. A third broken line position is position C in which the friction wheel 34 is in friction engagement with the rear friction disk 32, thus to drive the vehicle forwardly.

The spacing between disks 22, 32 is greater than the diameter of wheel 34 so that throw of the lever 48 and resultant movement of the wheel 35 will shift the drive between forward and reverse positions.

In the embodiment shown in FIGS. 1 and 2, no provision is made for adjusting the speed of rotation of the wheel 34, other than controlling engine speed. FIG. 3 illustrates an embodiment in which the gear set housing 37 with its support wheel 34 can be shifted axially along the power output shaft 36. Shaft 36 within housing 37 is provided with an axially shiftable coupling with the gear 51 of the gear set 38. In the illustrated embodiment gear 51 is axially slidable along splines 52 on shaft 36. Illustrative different positions of the housing 37 and wheel 34 are indicated in full and broken lines in FIG. 3.

Shifting motion can be produced in any convenient manner. In FIG. 3 one example is shown. A bell crank 53 has a fixed pivot 54 on the vehicle frame 11. One end of the crank is connected by a link 55 to the gear set housing 37 and the other end is connected by the control rod 56 to another control lever (not shown) on the control column 14. Shifting motion of the wheel 34 with respect to the friction disks 22, 32 will change the speed ratio between the disks and wheel.

While in the disclosed embodiments power flows from the belt 20 to the power output shaft 36, reverse flow is possible in other specific embodiments. For example, the shaft 36 could be the power input shaft and power could be delivered through the belt 20.

The disclosed construction avoids the necessity for cantilevered support of the friction disk 22 and avoids the need to provide mechanism to shift the friction wheel 34 from one side to the other of the axis of rotation of the disk 22. Accordingly, the invention reduces the complexity of the structure, reduces its cost, and provides a simple, effective and practical reversing gear train with a minimum of parts.

While in the described embodiments clutching is accomplished by shifting the friction wheel 35 between the friction disks 22, 32 which have fixed positions axially, it would be possible in other embodiments to mount the friction wheel 35 in a fixed position and to clutch and declutch the parts by shifting the friction disks 22, 32 axially of shaft 34.

We claim:

1. A drive train for a shaft mounted ground engaging wheel of a vehicle, said wheel having a ground wheel shaft, said drive train comprising a transverse shaft having axially spaced friction disks, a friction wheel disposed between said disks, swing bracket means on said ground wheel shaft for mounting said friction wheel in offset relation to the axis of the ground wheel shaft and swingable about said axis, shift means for swinging said swing bracket means to swing the friction wheel with respect to the disks for selective contact of the wheel with one or the other of said disks, thus to produce relative rotation between said disks and said wheel selectively in opposite directions depending on which disk is contacted by the wheel, said swing bracket means containing a gear set interconnecting said wheel and said shaft.

2. The invention of claim 2 in which said gear set is enclosed in a support housing on which said wheel is also supported, the shift means comprising a lever and linkages connecting the lever to the support housing.

3. The invention of claim 1 in which said vehicle has a control panel, said shift means comprising control means on the panel and linkages between said control means and the swing bracket.

* * * * *